United States Patent
Suzuki

(10) Patent No.: US 7,884,881 B2
(45) Date of Patent: Feb. 8, 2011

(54) IMAGE PICKUP APPARATUS WITH A DISPLAY UNIT PROVIDED ON A HANDLE

(75) Inventor: Katsuhiro Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 12/054,691

(22) Filed: Mar. 25, 2008

(65) Prior Publication Data
US 2008/0239142 A1 Oct. 2, 2008

(30) Foreign Application Priority Data
Mar. 27, 2007 (JP) ............................ P2007-082070

(51) Int. Cl.
*H04N 5/225* (2006.01)
(52) U.S. Cl. .................. 348/375; 348/376; 348/333.06
(58) Field of Classification Search ............ 348/333.06, 348/373, 375, 376; 352/242, 243; 396/148–150, 396/281–296, 373–386, 420, 422, 348, 372; D16/206, 241, 231, 230, 227, 200, 218, 202; 358/906; 386/117, 118
See application file for complete search history.

(56) References Cited

U.S. PATENT DOCUMENTS
5,982,429 A * 11/1999 Kamamoto et al. .... 348/333.06
2005/0024495 A1 2/2005 Hamrelius et al.
2007/0229694 A1 10/2007 Oshima et al.

FOREIGN PATENT DOCUMENTS
| EP | 1670239 A1 * | 6/2006 |
| JP | 2005175843 A * | 6/2005 |
| JP | 2005 210677 | 8/2005 |
| JP | 2006 72245 | 3/2006 |
| JP | 2008028776 A * | 2/2008 |

* cited by examiner

*Primary Examiner*—Nelson D. Hernández Hernández
(74) *Attorney, Agent, or Firm*—Frommer Lawrence & Haug LLP; William S. Frommer; Ellen Marcie Emas

(57) ABSTRACT

Disclosed is an image pickup apparatus configured to include an image pickup unit housing in which an image pickup unit that picks up images is housed, and a handle that is disposed on an upper part of the image pickup unit housing at a predetermined gap from the image pickup unit housing and is disposed approximately in parallel with an optical axis of light incident on the image pickup unit. The image pickup apparatus further includes a display unit that is placed on a lower surface of the handle and is operable when pulled out from the lower surface to display images picked up by the image pickup unit in a viewable manner.

8 Claims, 10 Drawing Sheets

IMAGE PICKUP APPARATUS WITH A DISPLAY UNIT PROVIDED ON A HANDLE

CROSS REFERENCES TO RELATED APPLICATIONS

The present invention contains subject matter related to Japanese Patent Application JP 2007-082070 filed in the Japanese Patent Office on Mar. 27, 2007, the entire contents of which being incorporated herein by reference.

BACKGROUND OF THE INVENTION

1. Field of the Invention

The invention relates to an image pickup apparatus that can be favorably applied to a video camera equipped with a display unit, for example.

2. Description of the Related Art

In recent years, it is becoming increasingly common for image pickup apparatuses such as digital still cameras and video cameras to be equipped with a display unit for displaying images being picked up. To make it easy to view such images, comparatively large display panels, such as a 3.5 inch panel, are often used.

When the display unit is large, the display unit will occupy a large area on the main body of the image pickup apparatus and therefore a configuration is sometimes used where the display unit is connected to a side surface or the like of the main body of the image pickup apparatus by a hinge or the like so that the display unit can be folded onto the image pickup apparatus. Among apparatuses utilizing this configuration, apparatuses where the display unit and the image pickup apparatus main body are rotatable about a rotation shaft so that the angle of the display unit can be optionally changed to an angle that is easy to view for the user are also becoming increasingly common.

However, when the display unit is closably and rotatably attached to the side surface of the image pickup apparatus main body in this way, it may become necessary to dispose the grip portion for supporting the image pickup apparatus main body so as to avoid the disposed position of the display unit. The disposed position of the grip portion could be located beside the lens, for example, but in such case, the disposed position of the grip portion would be beside the lens and the disposed position of the display position would be closer to the user than the disposed position of the grip portion. When the grip portion and the display unit are disposed in this way, if the user bends his/her arm that supports the image pickup apparatus main body in a state where the display unit has been rotated toward the user, the distance between the display surface of the display unit and the user's eyes will become too short. Accordingly, it may become difficult for the user to view the display unit.

When image pickup is carried out with the display unit lifted up to the height of the user's eyes, the user may have to support the image pickup apparatus main body with a large strain on the user's hand, making the apparatus tiring to use.

In addition, when the angle is adjusted so that the display unit faces upward and the image pickup apparatus main body is held lower than the user's chest, although less force may be required to support the image pickup apparatus main body, it will become necessary for the user to greatly move his/her line of sight when switching between viewing the display unit and viewing the subject. This results in an increased probability of the user missing favorable opportunities to record images.

Japanese Unexamined Patent Application Publication No. 2005-210677 discloses an apparatus where the display unit is closably and rotatably attached not to the side surface of the image pickup apparatus but to a grip portion on an upper part of the apparatus.

SUMMARY OF THE INVENTION

However, in the apparatus disclosed in Japanese Unexamined Patent Application Publication No. 2005-210677, the display unit is attached to an upper surface of the grip portion of the image pickup apparatus so as to be openable and closable in a direction that is perpendicular to the optical axis. This means that there is a severe restriction on the width of the display unit. In recent years, there has been an increase in HDTV (High Definition Television) broadcasts, with such broadcasts often using a 16:9 aspect ratio. To produce a display unit with this aspect ratio, it is necessary to increase the width of the display unit, which results in an increase in the proportion of the display unit that protrudes outward from the width of the grip.

Also, for the apparatus disclosed in Japanese Unexamined Patent Application Publication No. 2005-210677, since an operation unit is provided on the surface on which the display unit is stored, operations of the operation unit may not be made in a state where the display unit has been stored on the main body of the image pickup unit.

An embodiment of the invention attempts to provide a display unit that can be disposed at a position that is easy to view during use and can be stored when not in use at a position that does not block the user's view or obstruct operations.

An embodiment of the invention can be applied to an image pickup apparatus including an image pickup unit housing that houses an image pickup unit for picking up images, a handle, and a display unit that displays images picked up by the image pickup unit. The handle is disposed on an upper part of the image pickup unit housing at a predetermined gap from the image pickup unit housing and approximately in parallel with an optical axis of light incident on the image pickup unit. The display unit is placed on a lower surface of the handle and is operable when pulled out from the lower surface to display images picked up by the image pickup unit in a viewable manner.

Accordingly, it is possible to place the display unit on the lower surface of the handle when the display unit is not in use and to pull out the display unit from the lower surface of the handle when the display unit is being used.

According to an embodiment of the invention, it is possible to dispose the display unit at an easy-to-view position during use and to place the display unit at a position that does not block the user's view or obstruct operations when the display unit is not in use. In particular, since the display unit is placed on the lower surface of the handle, the display unit can be favorably stored on the handle when not in use.

DESCRIPTION OF THE PREFERRED EMBODIMENTS

Figure 1:
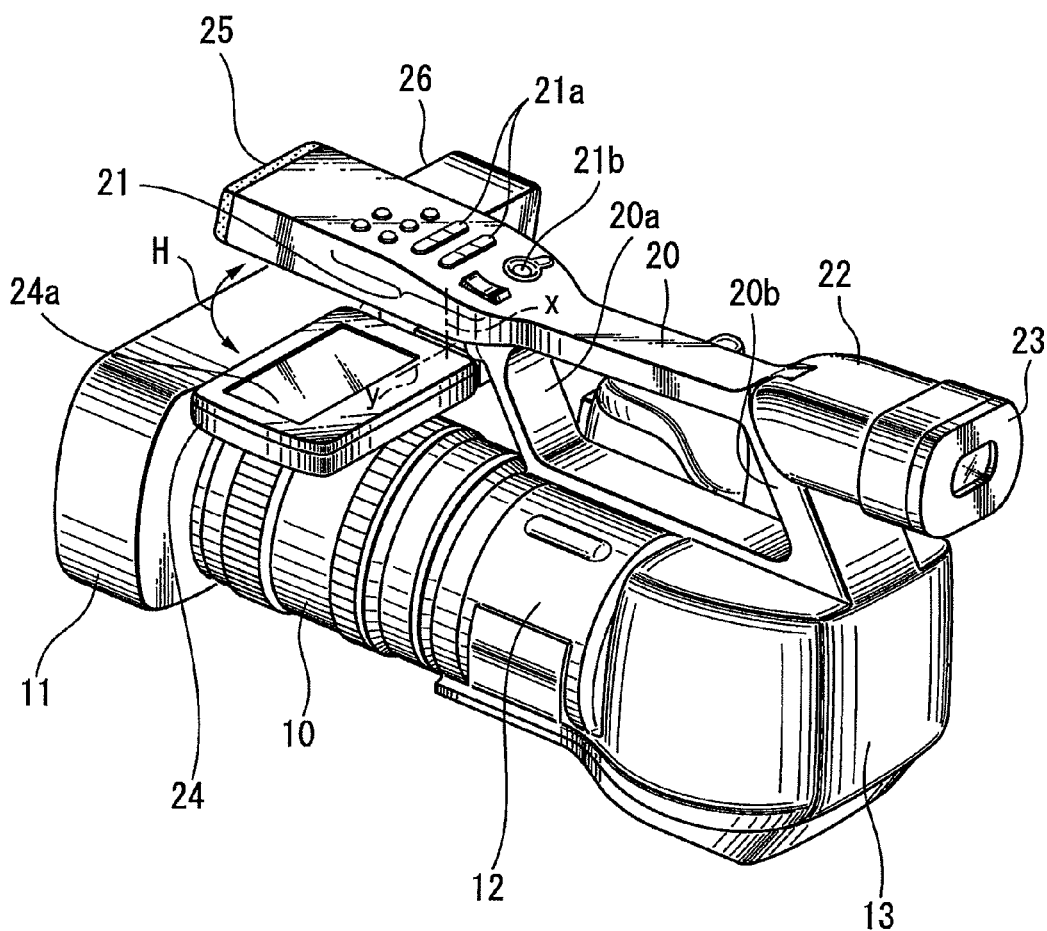
FIG. 1 is a perspective view of an example configuration of an image pickup apparatus according to an embodiment of the invention.

An embodiment according to the invention will now be described with reference to the attached drawings. FIG. 1 is a perspective view of an example configuration of an image pickup apparatus 100 to which the present embodiment has been applied. The image pickup apparatus 100 includes a lens unit 10 including a plurality of zoom lenses and the like, a lens hood 11 that blocks unnecessary light incident on the lens unit 10, an image pickup unit housing 12 that houses an image pickup unit for converting light from the subject incident via the lens unit 10 to an image signal, and a battery housing 13 that houses a battery supplying power to the various components of the image pickup apparatus 100.

The lens hood 11 is attached to a front end part of the image pickup apparatus 100 where light is incident on the lens unit 10, and the image pickup unit housing 12 is connected to an output end of the lens unit 10. The battery storage housing 13 is disposed to the rear of the image pickup unit housing 12.

A handle 20 is provided in parallel with the optical axis of the lens unit 10 above the various components described above. The handle 20 is supported by a front leg portion 20a provided above the image pickup unit housing 12 and a rear leg portion 20b provided above the battery storage housing 13. A gap of a certain size is provided between the image pickup unit housing 12 or the lens unit 10 and the handle 20 so that when the image pickup apparatus 100 is held by the user, the handle 20 is easy to hold by hand. The front leg portion 20a and the rear leg portion 20b are attached to a case main body including the image pickup unit housing 12 and the battery storage housing 13 so as to be inclined by a predetermined angle to the direction in which light from the subject is incident.

A viewfinder 22 for framing the images to be picked up and focusing is attached at a position that is an upper end of the rear leg portion 20b and a rear end part of the handle 20. An eyecup 23 is attached to the front end of the viewfinder 22. A small display unit with a screen size of around one inch is disposed inside the viewfinder 22, and the user can view the display by placing his/her eye close to the eyecup 23.

A microphone 25 is disposed at a front end part of the handle 20 and an audio processing unit that carries out an encoding process and the like on an audio signal obtained by the microphone 25 is housed inside an audio processing unit housing 26 disposed on a side surface of the handle 20. An operation unit for inputting operation signals relating to recording and playback of image signals obtained by the image pickup unit is disposed at a position on the upper surface of the handle 20 that is slightly withdrawn from the disposed position of the microphone 25 toward the inside of the handle 20.

The operation unit 21 is including playback operation buttons 21a for operations relating to playback, recording buttons 21b for designating a starting and stopping of recording, and the like. The playback operation buttons 21a include a REV button for high-speed playback operations in the reverse direction, a PLY button for playback operations, a FWD button for high-speed playback operations in the forward direction, a PRV button for moving to a previous clip, a STP button for stopping playback, and an NXT button for moving to a next clip.

A display unit 24 that displays an image signal obtained by the image pickup unit as images (or displays images when a recorded image signal is played back) is provided below the front end of the handle 20, that is, on the rear surface to the surface on which the operation unit 21 is disposed. The display unit 24 is constructed by housing a display panel 24a having a liquid crystal panel with a diagonal screen size of around 3.5 inches, for example, inside a case. Here, another type of display panel may be used instead of a liquid crystal display panel.

Figure 2:
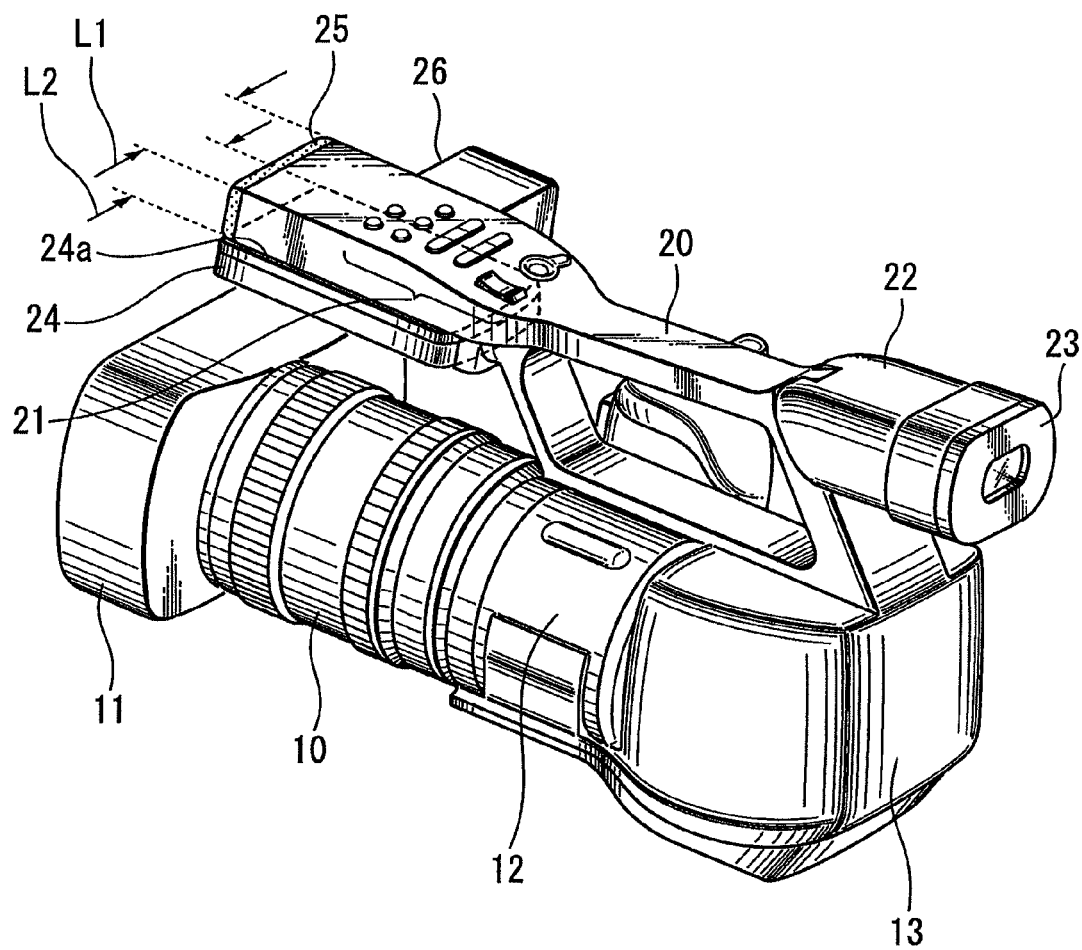
FIG. 2 is a perspective view of the image pickup apparatus according to an embodiment of the invention in a state where the display unit is stored.

The display unit 24 is attached to the lower surface of the handle 20 in a state where the display unit 24 can horizontally rotate by around 90° as shown by the arrow H in FIG. 1 about a vertical axis x of a connecting portion 40 (see FIGS. 1 and 9) provided between the display unit 24 and the handle 20. FIG. 2 shows an example where the display unit 24 has been rotated by an angle of around 90° in the direction of the arrow H and has been stored with the longitudinal direction (i.e., the width) of the display unit 24 aligned with the longitudinal direction of the handle 20.

FIG. 2 shows a state where the display unit 24 has been stored on the lower surface of the handle 20 with the display panel 24a facing upward. For ease of understanding, in FIG. 2 the part of the display unit 24 that is stored and hidden below the handle 20 is shown by dotted lines. As shown in FIG. 2, the length L2 of the shorter dimension (i.e., the height) of the display unit 24 is approximately equal to the length L1 of the shorter dimension (i.e., the width) of the handle 20. Accordingly, as shown in FIG. 2, in the state where the display unit 24 has been stored on the lower surface of the handle 20, the display unit 24 becomes integrated with the handle 20.

Figure 3:
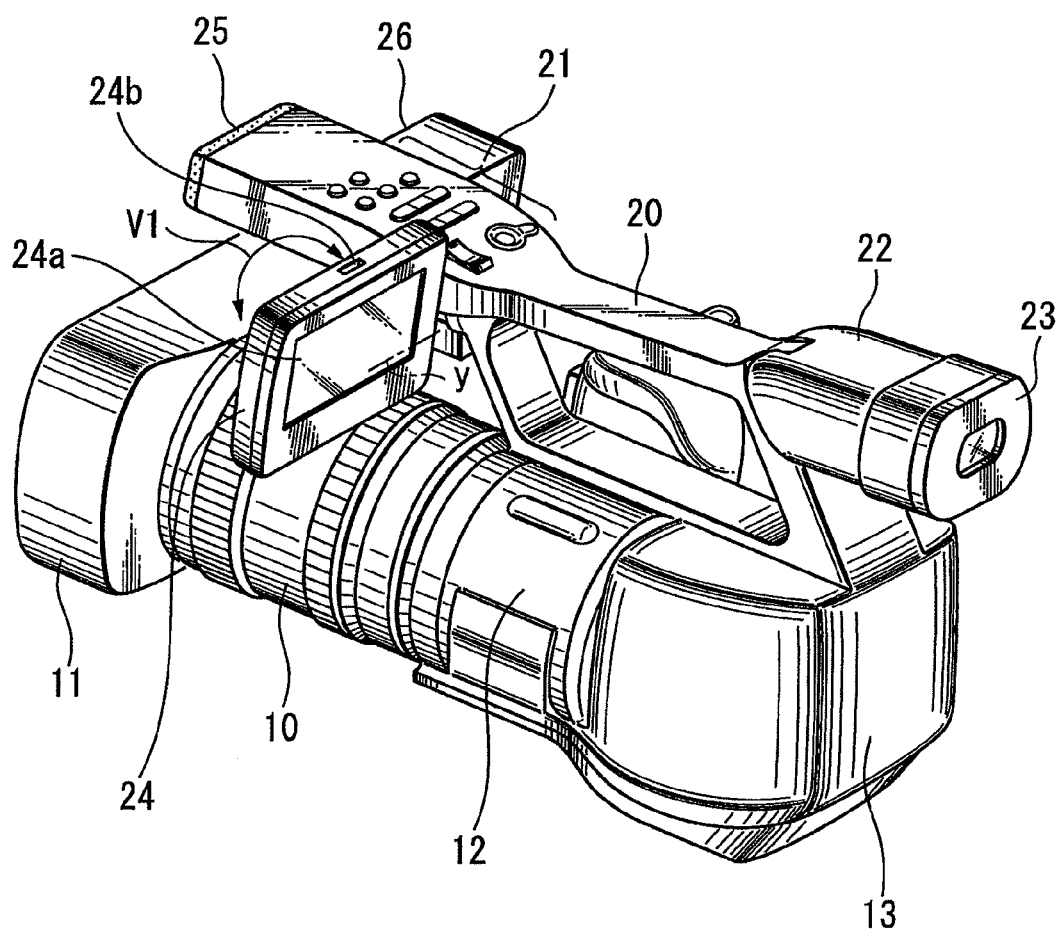
FIG. 3 is a perspective view of the image pickup apparatus according to an embodiment of the invention in a state where the display unit has been rotated toward the rear of the image pickup apparatus.

As shown in FIG. 1, in a state where the display unit 24 has been disposed at a position where the longitudinal direction (i.e., the width) of the display unit 24 makes an angle of 90° to the longitudinal direction of the handle 20, the display unit 24 is also rotatable about a horizontal axis y of the connecting portion 40 between the handle 20 and the display unit 24. FIG. 3 is a view showing a state where the display unit 24 has been vertically rotated.

FIG. 3 shows a state where the display unit 24 has been vertically rotated by approximately 90° from the state in FIG. 1 about the horizontal axis y of the connecting portion 40 disposed between a lower portion of the handle 20 and the display unit 24. Since the display unit 24 is disposed close to the front end of the handle 20 in this way, when the display unit 24 is rotated toward the rear of the image pickup apparatus 100 as shown in FIG. 3, a suitable spacing is produced between the disposed position of the display unit 24 and the position of the user's eyes that are assumed to be to the rear of the eyecup 23. This means that the images displayed on the display unit 24 are easy to view for the user.

As shown in FIG. 3, in the state where the display unit 24 is disposed at a position where the longitudinal direction of the display unit 24 makes an angle of 90° to the longitudinal direction of the handle 20, the display unit 24 can be rotated in the direction of the arrow V1 in FIG. 3 about the axis y (i.e., the display unit 24 can be tilted). In FIG. 3, the display surface of the display unit 24 is shown having been disposed at a position that makes an angle of approximately 90° to the horizontal plane, but it is also possible to have the display unit 24 fixed at a position where the display surface is tilted by 60°, 45°, or the like. By using this configuration, it is possible for the user to optionally change the angle of the display unit 24 to an angle that is easy to view.

Figure 4:
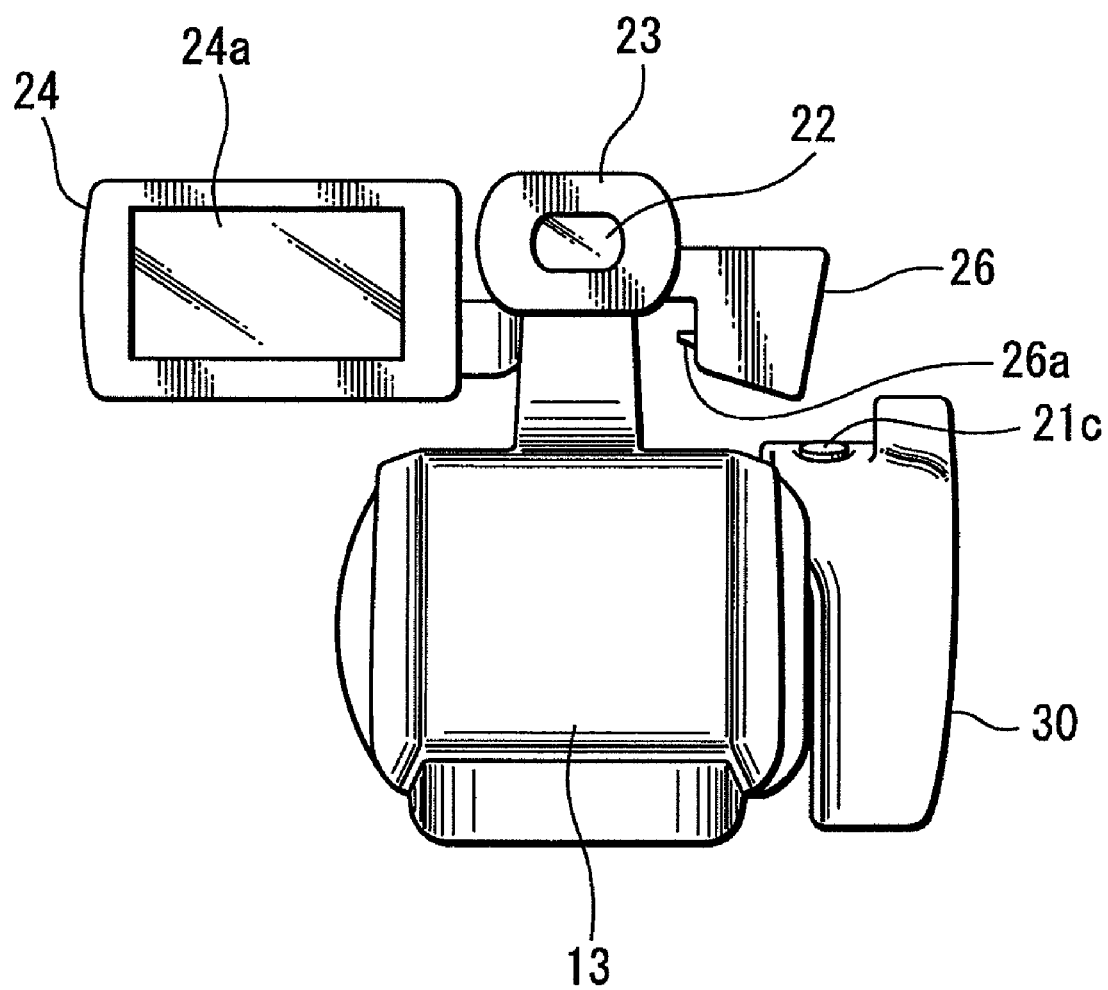
FIG. 4 is a rear view of the image pickup apparatus according to an embodiment of the invention in a state where the display unit has been rotated toward the rear of the image pickup apparatus.

An example where the image pickup apparatus 100 shown in FIG. 3 is viewed from the viewfinder 22 side, i.e., from the rear is shown in FIG. 4. When the image pickup apparatus 100 is viewed from the rear as shown in FIG. 4, the display unit 24 is disposed at a position on the left of the viewfinder 22 and the disposed positions of the viewfinder 22 and the display panel 24a of the display unit 24 are at approximately the same height in the vertical direction.

Also, as shown in FIG. 4, a grip portion 30 is disposed to the right of the case of the image pickup apparatus 100 when looking from the rear. During shooting, the user places the palm of his/her right hand over the grip portion 30 to support the image pickup apparatus 100. Accordingly, it is possible to avoid camera shake and to shoot video stably. A recording button 21c that designates a start or stop of recording is provided on the grip portion 30 and by pressing the recording button 21c when the user's hand is on the grip portion 30, it is possible to designate a start or stop of recording.

Figure 5:
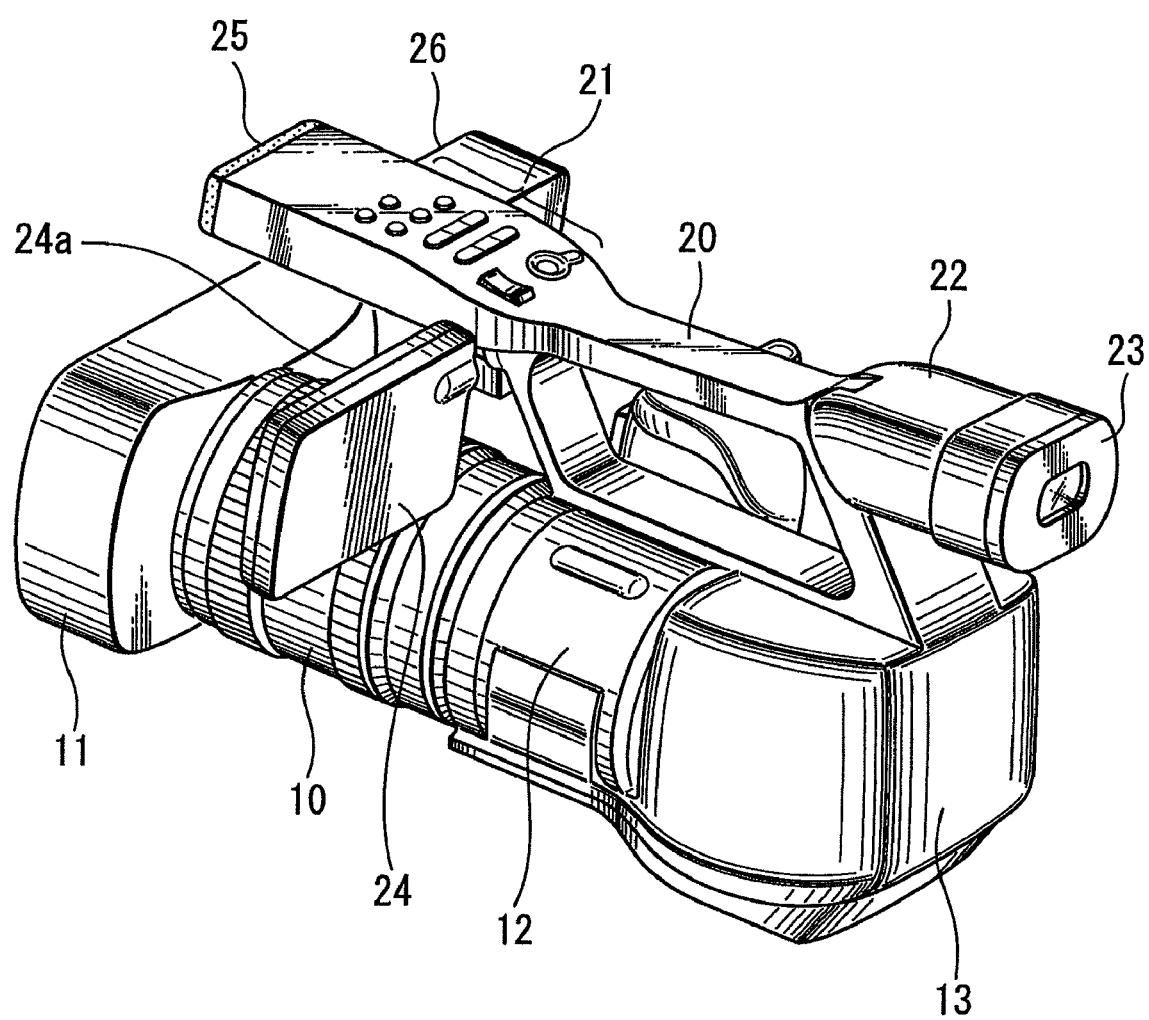
FIG. 5 is a perspective view of the image pickup apparatus according to an embodiment of the invention in a state where the display unit has been rotated toward the front of the image pickup apparatus.
Figure 6:
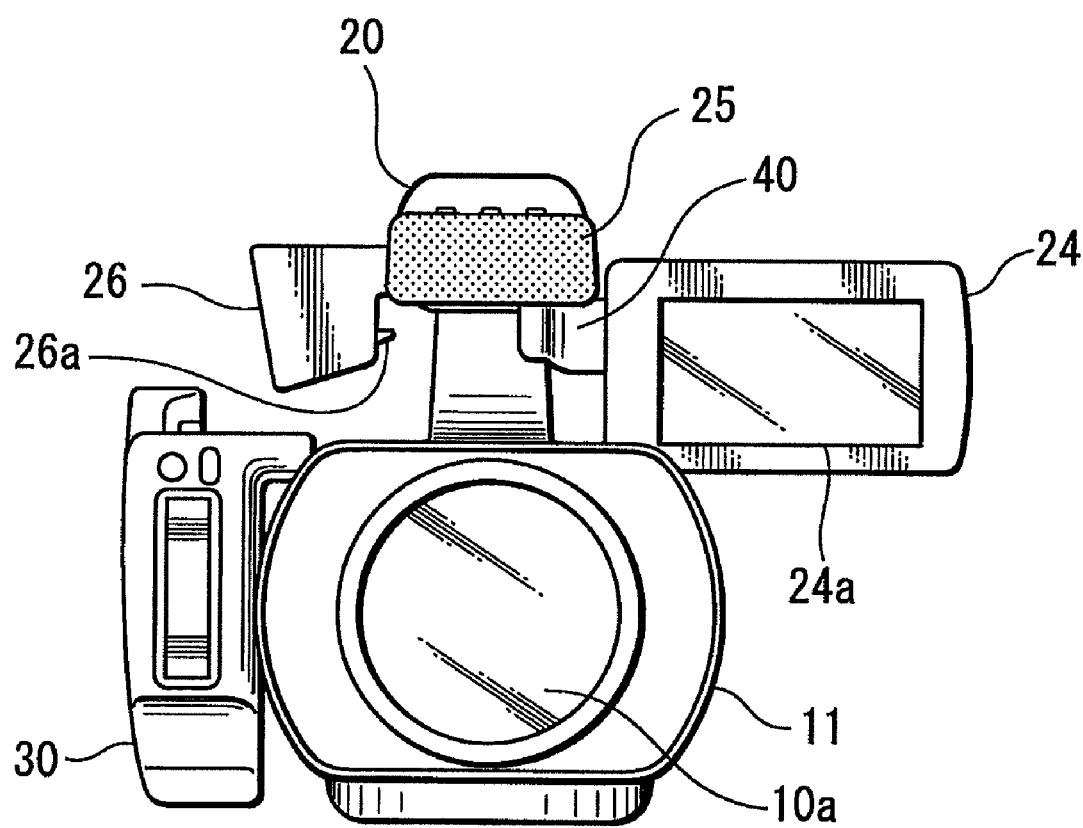
FIG. 6 is a front view of the image pickup apparatus according to an embodiment of the invention in a state where the display unit has been rotated toward the rear of the image pickup apparatus.

FIG. 5 shows an example where the display unit 24 shown in FIG. 3 has been rotated by 180° in the direction of the arrow V1 in FIG. 3. In FIG. 5, the display panel 24a of the display unit 24 is shown having been rotated so as to face the front end of the handle 20, that is, the direction in which light is incident. FIG. 6 is a front view, i.e., a view taken from the direction in which light is incident, of the image pickup apparatus 100 in the state shown in FIG. 5.

FIG. 6 shows a state where the microphone 25 has been disposed at the front end part of the handle 20 and out of the lenses that construct the lens unit 10, a lens 10a that is disposed closest to the incident light is visible. The connecting portion 40 of the display unit 24 is provided on the lower surface of the handle 20. The vertical axis x for rotating the display unit 24 horizontally and the horizontal axis y for rotating the display unit 24 vertically (the axes x, y are shown in FIGS. 1 and 19) are disposed inside the connecting portion 40.

In this way, when the display panel 24a of the display unit 24 is oriented toward the direction in which light is incident, it is possible for the user to simultaneously shoot images and view the images displayed on the display panel 24a, such as when the user is a reporter doing an on-location report in front of the camera. That is, it is possible for the user to shoot video of himself/herself while checking the framing and focusing of the images.

Figure 7:
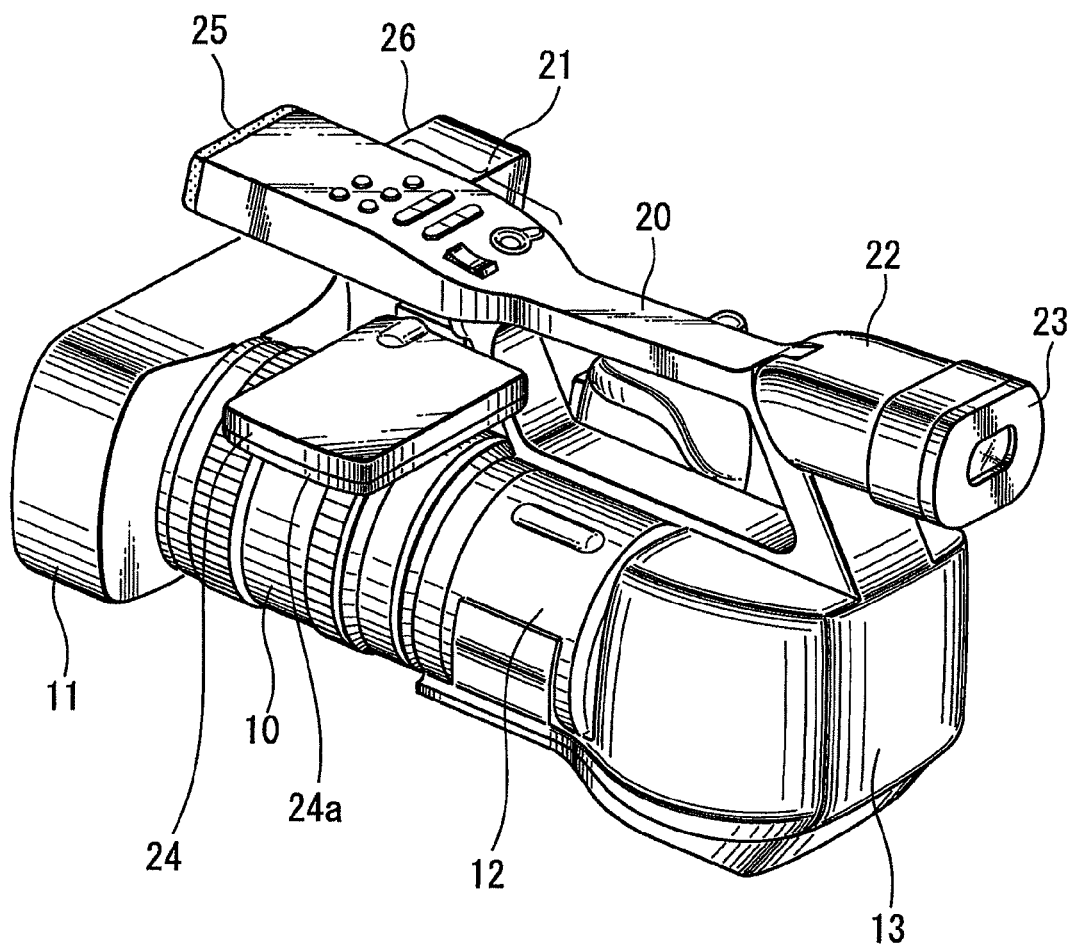
FIG. 7 is a perspective view of the image pickup apparatus according to an embodiment of the invention in a state where the display unit has been rotated downward.
Figure 8:
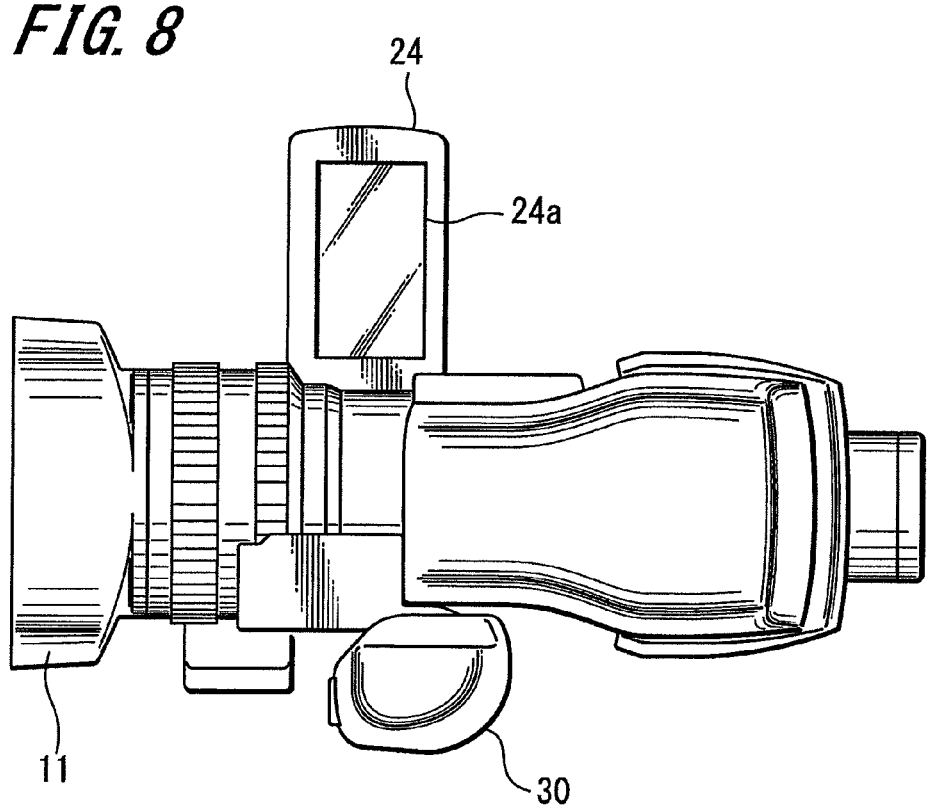
FIG. 8 is a bottom view of the image pickup apparatus according to an embodiment of the invention in a state where the display unit has been rotated downward.

Also, as shown in FIG. 7, it is also possible for the display panel 24a of the display unit 24 to be fixed facing downward. FIG. 8 is a bottom view of the image pickup apparatus 100 in FIG. 7 when viewed from below. In FIG. 8, the bottom surface of the image pickup apparatus 100 is shown from below. In this way, since it is possible to fix the display panel 24a of the display unit 24 so as to face directly downward relative to the image pickup apparatus 100, even when images are shot with the image pickup apparatus 100 disposed above the user's line of vision, such as when the user extends his/her arm above his/her head, it is possible to display the images obtained via the lens unit 10 on the display panel 24a. Accordingly, it is possible for the user to check the framing and the like of video during shooting, even when the subject is located at a position that may not be directly seen by the user.

Figure 9:
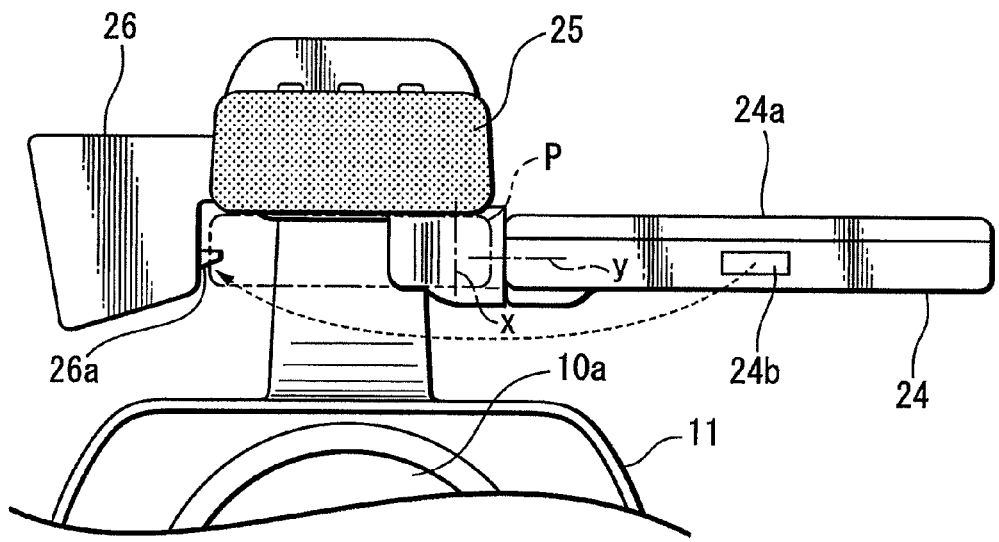
FIG. 9 is a front view of the image pickup apparatus according to an embodiment of the invention showing one example of the disposed positions of a protruding portion and a groove portion.

Also, as shown in FIG. 9, a groove portion 24b is provided on the side where light is incident (that is, the top surface as a concave on a side surface of the side surfaces of the display unit 24 when the display unit 24 has been erected as shown in FIG. 3). In addition, as shown in FIG. 2, a protruding portion 26a is provided on the handle 20 at a position corresponding to the groove portion 24b when the display unit 24 is placed on the lower surface of the handle 20. However, as described later, in reality the protruding portion 26a is provided not on the handle 20 itself but on the audio processing unit housing 26 that is attached to the side of the handle 20. FIG. 9 shows the positional relationship between the groove portion 24b and the protruding portion 26a. FIG. 9 is a front view, i.e., a view where the image pickup apparatus 100 shown in FIG. 1 is viewed from the direction in which light is incident, and the position of the display unit 24 in FIG. 9 corresponds to the position shown in FIG. 1. FIG. 9 also shows that the groove portion 24b is provided on the side surface of the display unit 24.

In FIG. 9, the position of the display unit 24 when the display unit 24 is placed on the lower surface of the handle 20 is shown by dashed double dotted lines as a display unit storage position P. When the display unit 24 is disposed at the display unit storage position P, the audio processing unit housing 26 will be positioned next to the side surface of the display unit 24, and for this reason, the protruding portion 26a is provided on the side surface of the audio processing unit housing 26. That is, in a state where the display unit 24 has been stored at the display unit storage position P, the protruding portion 26a provided on the side surface of the audio processing unit housing 26 is inserted inside the groove portion 24b provided in the side surface of the display unit 24. Accordingly, even if a large force acts perpendicular to the display unit 24, such as when the image pickup apparatus 100 is mistakenly dropped, the protruding portion 26a inserted inside the groove portion 24b of the display unit 24 will reduce the force that acts in the perpendicular direction. This means that an excessive force will not act on a shaft or the like that supports the display unit 24, which means that it is possible to prevent damage to the holding mechanism of the display unit 24.

A spring is installed inside the connecting portion 40 between the display unit 24 and the handle 20 so that when the display unit 24 is rotated about the axis x of the connecting portion 40, the force of the installed spring acts upon the display unit 24. This means that when the display unit 24 is moved from a state where the display unit 24 is disposed so that an angle of 90° is made between the longitudinal direction of the display unit 24 and the longitudinal direction of the handle 20 as shown in FIG. 1 to a position where the display unit 24 is placed on the lower surface of the handle 20 as shown in FIG. 2, by applying only a little force to the display unit 24, it is possible to automatically place the display unit 24 at the storage position on the lower surface of the handle 20 using the spring force.

Figure 10:
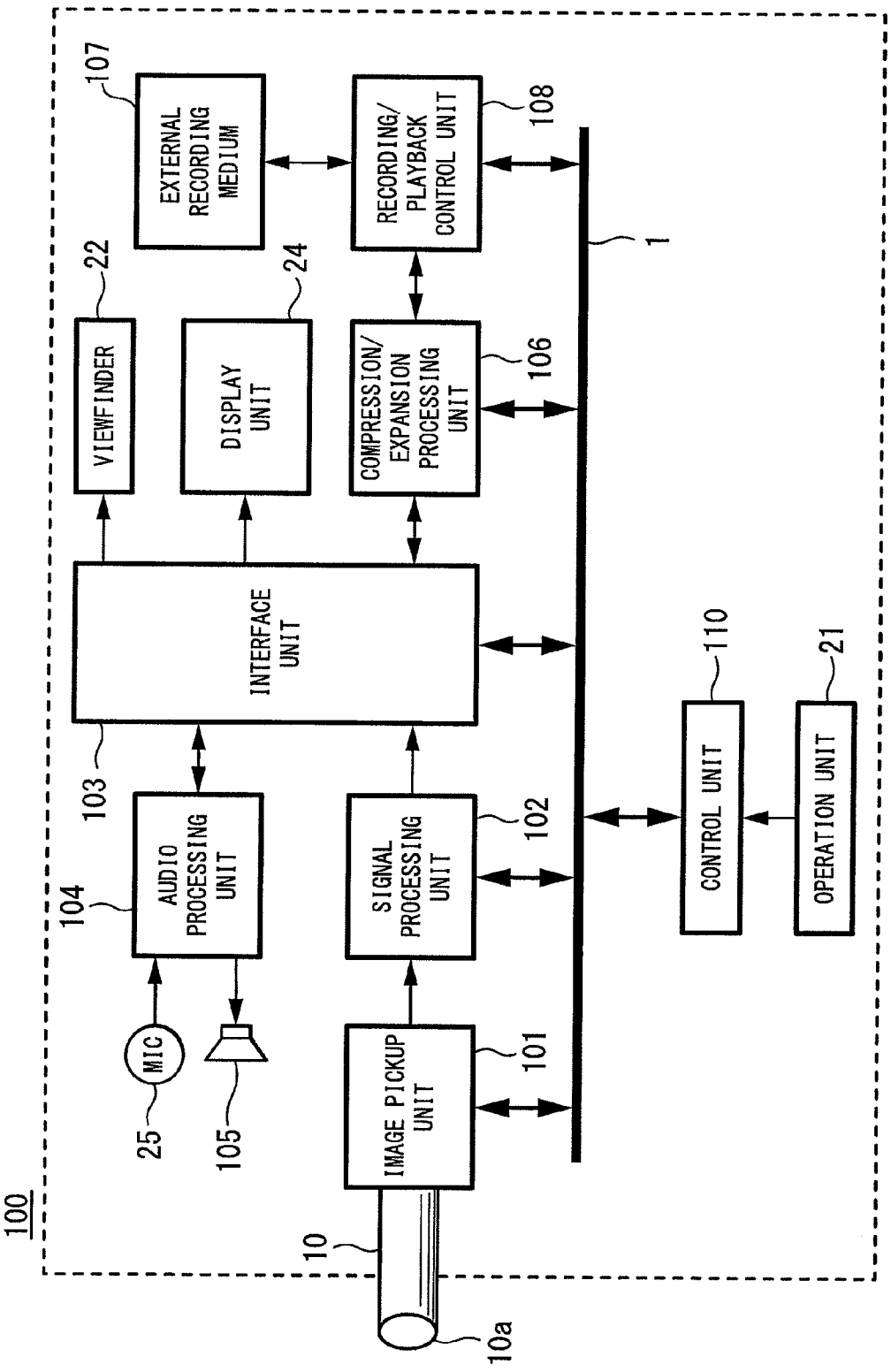
FIG. 10 is a block diagram showing an example internal configuration of the image pickup apparatus according to an embodiment of the invention.

FIG. 10 is a block diagram showing the internal configuration of the image pickup apparatus 100 according to the present embodiment. The image pickup apparatus 100 shown in FIG. 10 includes the lens unit 10 including a lens system including the lens 10a and an image pickup unit 101 that photoelectrically converts the light from the subject that has been transmitted and focused by the lens system of the lens unit 10 and outputs the light as an image signal. The image pickup unit 101 includes an analog/digital converter unit (hereinafter referred to as the "A/D converter unit"), not shown, and as the next stage is connected to a signal processing unit 102 that carries out digital signal processing on the digital image signal outputted by the A/D converter unit.

Knee correction that compresses image signals with a certain luminance level or higher, γ correction that corrects the levels of the image signal in accordance with a γ curve set in advance, and a white clip process and black clip process that limit the signal levels of the image signal to a predetermined range are carried out in the signal processing unit 102.

Image pickup by the image pickup unit 101 and the processing by the signal processing unit 102 are carried out based on control by a control unit 110. The control unit 110 is a central control device including a CPU (Central Processing Unit) or the like, and carries out control of the components of the image pickup apparatus 100 that are connected via the transfer line 1, in addition to controlling the image pickup unit 101 and the signal processing unit 102. Control over the various components by the control unit 110 is carried out based on operation inputs made via the operation unit 21 connected to the control unit 110. As described earlier, the operation unit 21 is including the playback operation buttons 21a and the recording switches 21b and 21c.

The image signal subjected to digital signal processing by the signal processing unit 102 is transferred to an interface unit 103 that transfers data between the various components. The interface unit 103 is connected to the viewfinder 22 for framing and focusing the images being shot, the display unit 24 that displays the images being picked up by the image pickup unit 101 or played back images that have been recorded on an external recording medium, described later, and a compression/expansion processing unit 106 that compresses or expands an image signal. The compression/expansion processing unit 106 is connected to a recording/playback control unit 108 and via the recording/playback control unit 108 to an external recording medium 107.

The viewfinder 22 and the display unit 24 are having liquid crystal panels, for example, and aside from images that have been shot, also display a list of thumbnail images generated by reducing images of each clip and display metadata that is attribute information of images.

The compression/expansion processing unit 106 carries out compression of the image signal picked up by the image pickup unit 101 according to a standard such as MPEG (Moving Picture Experts Group) format. The data compressed by the compression/expansion processing unit 106 is transferred to the external recording medium 107 via the recording/playback control unit 108 and is recorded on the external recording medium 107. The compression/expansion processing unit 106 also carries out processing that expands compressed image data recorded on the external recording medium 107 and transfers the decompressed image data to the interface unit 103.

The recording/playback control unit 108 carries out a process that writes (records) image data compressed according to a predetermined format by the compression/expansion processing unit 106 onto the external recording medium 107 and control that reads out and plays back image data that has been recorded on the external recording medium 107.

In this way, since the display unit 24 is disposed on the lower surface of the handle 20 so that the longitudinal direction of the display unit 24 is aligned in the same direction as the longitudinal direction of the handle 20, if the display unit 24 is disposed at such position such as when the display unit 24 is not in use, the display unit 24 will become integrated with the handle 20 and will not block the user's view.

When doing so, since the display surface of the display unit 24 (i.e., the surface on which the display panel 24a is mounted) will face the handle 20, the display surface of the display unit 24 will not be exposed so that damage to the display unit 24 can be prevented.

Also, since the display unit 24 is disposed on the lower surface of the handle 20 in a state where the longitudinal direction of the display unit 24 is aligned in the same direction as the longitudinal direction of the handle 20, the restrictions on the longitudinal direction of the display unit 24 are eased. Since the longitudinal direction of the display unit 24 is the width of the display unit 24 in a state where the display unit 24 has been horizontally rotated by 90° from the lower surface of the handle 20, it is easier to realize a horizontally wide aspect ratio, such as 16:9, for the display unit 24.

Since the operation unit 21 is provided on the upper surface of the handle 20 at a separate location to the storage position of the display unit 24, it is possible to operate the operation unit 21 at any time regardless of where the display unit 24 is disposed.

Since the lower surface of the front end part of the handle 20 is used as the disposed position of the display unit 24, when the display unit 24 has been perpendicularly rotated about an axis provided perpendicularly to the display surface, a suitable spacing will be achieved between the user's eyes and the display surface of the display unit 24. This means it is easy for the user to view the images displayed on the display panel 24a of the display unit 24.

In the state where the display unit 24 is placed on the lower surface of the handle 20, the protruding portion 26a provided on the side surface of the audio processing unit housing 26 on a side surface of the handle 20 is inserted into the groove portion 24b provided in the side surface of the display unit 24, and therefore it is possible to prevent the display unit 24 from moving vertically, even when a shock or the like is applied to the image pickup apparatus 100.

Figure 11:
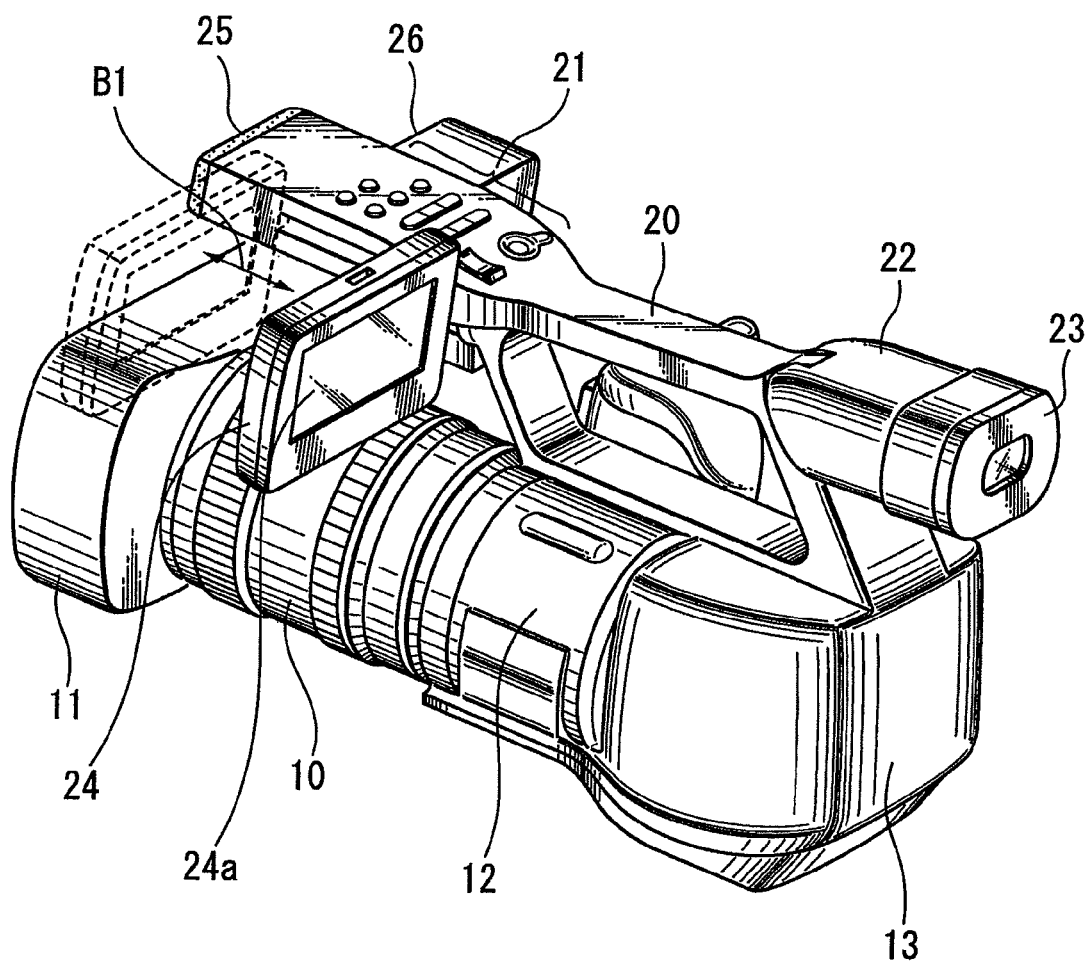
FIG. 11 is a perspective view showing an example of the disposed position of the display unit according to another embodiment of the invention.

Note that although an example where the connecting portion 40 having the axes for rotating the display unit 24 vertically and horizontally are fixed to the handle 20 has been described, like the example shown in FIG. 11, it is possible for the display panel 24a of the display unit 24 to be movable in the front-rear direction along the optical axis shown as "B1" in FIG. 11 in a state where the display panel 24a of the display unit 24 has been rotated toward the viewfinder 22. With this configuration, it is possible to optionally adjust the spacing between the user's eyes and the display surface of the display unit 24 according to the user's preferences.

Although an example where the invention is applied to an image pickup apparatus that is capable of image pickup and simultaneous recording has been described in the above embodiment, it is also possible to apply the invention to an image pickup apparatus or video camera of another configuration which is connected to a recording device for recording the picked up images.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   an image pickup unit housing in which an image pickup unit that picks up images is housed;
   a handle that is disposed on an upper part of the image pickup unit housing at a predetermined gap from the image pickup unit housing and is disposed approximately in parallel with an optical axis of light incident on the image pickup unit;
   a viewfinder, that frames images, attached to a rear end of the handle;
   an operation unit disposed on an upper surface of the handle toward a forward end of the handle; and
   a display unit that is placed on a lower surface of the handle directly beneath the operation unit and is operable when pulled out from the lower surface by rotating the display unit about a first axis of a connecting portion provided on the handle to display images picked up by the image pickup unit in a viewable manner, wherein the first axis is perpendicular to a longitudinal direction of the handle.

2. An image pickup apparatus according to claim 1, wherein
   the display unit is disposed on the lower surface of a front end part of the handle in a state where a width direction of the display unit is aligned with a longitudinal direction of the handle and the display unit is horizontally pulled out by rotating the display unit about the first axis.

3. An image pickup apparatus according to claim 2, wherein
   in a state where the display unit has been pulled out from the lower surface of the handle about the first axis of the connecting portion, the display unit is rotatable about a second axis of the connecting portion that is perpendicular to the first axis of the connecting portion so as to tilt the display unit.

4. An image pickup apparatus according to claim 1, wherein
   a height dimension of a display surface of the display unit approximately matches a width of the handle and the display unit is stored with the height of the display surface of the display unit aligned with the width of the handle.

5. An image pickup apparatus according to claim 1, wherein
   the operation unit inputs instructions relating to recording and playback of images obtained by the image pickup unit, wherein
   the operation unit is provided on the upper surface of a part of the handle where the display unit is stored.

6. An image pickup apparatus according to claim 1, wherein
   when the display unit is disposed on the lower surface of the handle, a display surface of the display unit faces the handle.

7. An image pickup apparatus according to claim 1, wherein
   a microphone for picking up peripheral sound and outputting an audio signal is provided at a front end of the part of the handle where the display unit is stored.

8. An image pickup apparatus according to claim 1, wherein
   the display unit is provided with a concave that is operable to engage a protrusion on the handle in a state where the display unit is placed on the lower surface of the handle.

* * * * *